United States Patent
Pons et al.

(10) Patent No.: US 11,488,367 B2
(45) Date of Patent: Nov. 1, 2022

(54) METHOD AND ASSEMBLY FOR INTERVENTION IN A RADIOACTIVE ZONE

(71) Applicant: FRAMATOME, Courbevoie (FR)

(72) Inventors: Guillaume Pons, Mercurol-Veaunes (FR); Franck Grember, Lyons (FR); Audrey Casteleira, Lyons (FR)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 17/252,712

(22) PCT Filed: Jun. 20, 2019

(86) PCT No.: PCT/EP2019/066405
§ 371 (c)(1),
(2) Date: Dec. 15, 2020

(87) PCT Pub. No.: WO2019/243543
PCT Pub. Date: Dec. 26, 2019

(65) Prior Publication Data
US 2021/0158628 A1 May 27, 2021

(30) Foreign Application Priority Data
Jun. 22, 2018 (FR) .................................. 1855601

(51) Int. Cl.
*G06T 19/00* (2011.01)
*G01T 1/02* (2006.01)
(Continued)

(52) U.S. Cl.
CPC .............. *G06T 19/006* (2013.01); *G01T 1/02* (2013.01); *G02B 27/0172* (2013.01);
(Continued)

(58) Field of Classification Search
CPC .............................. G06T 19/006; G06T 17/05
(Continued)

(56) References Cited

U.S. PATENT DOCUMENTS 6,815,687 B1 * 11/2004 Branch-Sullivan .......................... H01L 27/14658
250/330
9,479,697 B2 * 10/2016 Aguilar ................ H04N 5/2258
(Continued)

FOREIGN PATENT DOCUMENTS

CN  105639818 A  6/2016

OTHER PUBLICATIONS

Corresponding Search Report for PCT/EP2019/066405.
Corresponding Search Report for FR1855601.

*Primary Examiner* — Thomas J Lett
(74) *Attorney, Agent, or Firm* — Davidson, Davidson & Kappel, LLC (57) ABSTRACT

A method for intervention in a radioactive zone includes production of a digital model representing the three-dimensional topography of the radioactive zone (1); and intervention of the at least one operator in the radioactive zone (1). The intervention step includes repeated measurement of the radioactive radiation intensity by a portable detector (3), and determination of the spatial coordinates of the portable detector (3) at the time of the measurement; recording of a plurality of said measurements and the corresponding spatial coordinates in the digital model; materialisation of the recorded measurements in an augmented reality device (5) worn by the at least one operator, by a plurality of discrete holographie symbols (7).

11 Claims, 2 Drawing Sheets

(51) Int. Cl.
*G02B 27/01* (2006.01)
*G06T 17/05* (2011.01)
*G21F 3/025* (2006.01)

(52) U.S. Cl.
CPC .............. *G06T 17/05* (2013.01); *G21F 3/025* (2013.01); *G02B 2027/0174* (2013.01)

(58) Field of Classification Search
USPC ........................................................ 345/419
See application file for complete search history.

(56) References Cited

U.S. PATENT DOCUMENTS

| | | | |
|---|---|---|---|
| 9,947,138 B2* | 4/2018 | Bare | ........................ H04W 4/02 |
| 2015/0294506 A1 | 10/2015 | Bare et al. | |
| 2016/0203240 A1 | 7/2016 | Dubart et al. | |
| 2017/0205512 A1* | 7/2017 | Asselot | ..................... G01T 7/00 |
| 2019/0365339 A1* | 12/2019 | Flexman | ............... A61B 6/4441 |
| 2020/0391054 A1* | 12/2020 | Pigott | ........................ G01T 1/02 |
| 2021/0137483 A1* | 5/2021 | Pigott | ........................ G01T 1/02 |

* cited by examiner

METHOD AND ASSEMBLY FOR INTERVENTION IN A RADIOACTIVE ZONE

The present disclosure concerns intervention operations in a radioactive zone.

In the context of maintenance operations carried out in nuclear installations, operators working in controlled areas are exposed to several types of risks:

- radiological risk (ambient dose rate, hot spots, radiological contamination).
- conventional safety (falls on the same level, load handling, work at height, risk of anoxia, burns, etc.).

BACKGROUND

Taking these various risks into account allows maintenance operations to be carried out in complete safety, while limiting the integrated dose to the strict minimum (ALARA principle).

Many of these risks are undetectable by the human senses (contamination, ionising radiation), or can be masked by the working environment (risk of falling into a floor opening, no traffic zone during load handling operations, or more generally any risk situation that cannot be permanently marked). In addition, protective equipment can limit the operator's field of vision, which further increases the risk when handling a load, or prevents operators from consulting their operational dosimeters.

Currently, risks are dealt with as follows.

Irradiation risk is covered by the use of a survey meter and the wearing of an operational dosimeter by each operator. Audible and luminous alarms can warn the operator if a predefined threshold is exceeded.

The risk of contamination is covered by carrying out measurements with a portable contamination meter or the possible use of an aerosol beacon to measure the level of fixed or atmospheric contamination respectively.

Conventional material risks are physically materialised by the installation of a physical beacon in the case of an opening in the floor or a heavy load handling area.

In addition, before the start of operations in controlled areas:

- a preliminary map on paper (dosimetry and level of contamination) is sent to the workers or posted at the entrance to the work area; this map is produced by the RPS service (Risk Prevention Service); if the area has hot spots (points of high irradiation or high radiological contamination), standardised signage (coloured sorter and dose rate value at the hot spots) can be put in place by the RPS service;
- conventional risks are discussed orally during preliminary visits or during the final debriefing meetings, just before the intervention.

Technical solutions have recently been proposed to limit risks during interventions in radioactive areas.

A first solution consists of providing additional visual and sound surveillance, via an external supervision bay, with teledosimetric monitoring of the operators by the supervisor. This system is particularly well adapted to the case of interventions at the bottom of a swimming pool or interventions requiring the wearing of a leaktight ventilated suit (TEV in French).

According to a second existing solution, a supervision and risk prevention station allows interconnecting cameras, teledosimeter or other sensors, and archiving the data in a supervision application.

The current approach, despite the improvements brought about by the above technical solutions, has significant drawbacks.

Concerning the risks related to dosimetry:

- the operator relies on previously measured states (paper cartography which may have changed since the last readings), and is obliged to check the dosimetry of his intervention perimeter using a radiameter;
- the sharing of this information with the other operators is done orally and does not take into account potential changes in the configuration of the radiological situation of the premises during the intervention;
- there are no ALARA-type fallback points (points in the intervention zone where the dose rate is minimum), due to a lack of knowledge of the mapping of dose rates, particularly in high-irradiation environments such as reactor pools;
- depending on the type of clothing worn, individual operational dosimetry is difficult to read in real time and is often checked at the end of the shift, except when using remote dosimeters or a back-up voice system enabling oral information from the supervisor to the operators;
- in the case of the second technical solution mentioned above, the voice, supervision and teledosimetry systems are directly impacted by the problems of data transmission by electromagnetic waves encountered in the reactor building, in particular the disturbances induced by the metal liner of the reactor pool or the thick concrete blocks physically separating the various premises.

Concerning the risks linked to contamination, the situation is more or less the same as for the risks linked to dosimetry.

Concerning classic risks:

- These risks are assessed during a preliminary site visit and during development meetings;
- no map, even on paper, stipulates the location of risks or their evolution;
- only a voice communication during an intervention of a operator with a TEV (leaktight ventilated suit) can allow this operator to share these risks with the other operators working with him, directly or via the supervisor.

In this way, information on these different risks:
- is not processed in real time;
- is difficult to materialise;
- is only shared orally.

SUMMARY

In this context, a method is provided for intervening in a radioactive zone to better manage the risks, in particular the risks related to irradiation.

To this end, the present disclosure relates to a method for intervention by at least one operator in a radioactive zone, the method comprising the following steps:

- obtaining a digital model representing the three-dimensional topography of the radioactive zone;
- intervention of at least one operator in the radioactive zone, the intervention step comprising at least the following sub-steps:
  - repeatedly measuring the intensity of the radioactive radiation with a portable detector, in particular the portable detector worn by the at least one operator, and determining the spatial coordinates of the portable detector at the time of measurement;

recording in the digital model of a plurality of said measurements and the corresponding spatial coordinates;

materialisation of the recorded measurements in an augmented reality device carried by the at least one operator, by a plurality of discrete holographic symbols, using the digital model, each holographic symbol indicating the intensity of radioactive radiation of one of the recorded measurements and being placed so as to appear visible to the at least one operator at the corresponding spatial coordinates.

Because the recorded measurements are materialised in an augmented reality device worn by the at least one operator, the operator has simple access to the data and knows in real time the dose rate in his or her environment.

The use of discrete holographic symbols, indicating the intensity of radioactive radiation, placed in such a way as to appear to the at least one operator at the corresponding spatial coordinates, enables the information to be transmitted to her or him in a legible manner. This information is not legible when transmitted in the form of a cloud of dots filling the entire area.

On the contrary, the present disclosure provides for the dose rate measurements to be materialised only at a limited number of points, typically along the path travelled by the operator in the radioactive zone when the portable detector is worn by the operator.

The method of the present disclosure may also have one or more of the following features, considered individually or in any technically possible combination:

the augmented reality device comprises at least one helmet worn by the at least one operator, with a translucent display surface placed in front of the eyes of the at least one operator, the holographic symbols being displayed on the display surface in such a way as to appear visible to the at least one operator at the corresponding determined spatial coordinates;

the obtaining step comprises a sub-step of recording images of the radioactive area with at least one camera, in particular the at least one camera carried by the at least one operator, and a sub-step of determining the digital model using the recorded images;

the obtaining stage is carried out simultaneously with the intervention stage, the digital model being progressively determined or enriched with the images recorded during the intervention stage;

the recording of one of the measurements and its materialisation are triggered by at least one operator, the said discrete holographic symbol materialising the intensity of the radioactive radiation measured by the portable detector at the time of triggering;

the addition of a discrete holographic symbol in the augmented reality device is triggered when the intensity of the radioactive radiation measured by the portable detector is greater than a predetermined value;

the method includes a step of recording in the digital model at least one of the following elements associated with corresponding spatial coordinates: ALARA fallback zone, conventional non-nuclear hazard;

the intervention step comprises a sub-step of materialisation of the at least one element in the augmented reality device by a specific holographic symbol appearing in a visible way for the operator at the corresponding spatial coordinates;

the digital model is shared by several operators, each operator being equipped with an augmented reality device materialising the recorded measurements by a plurality of discrete holographic symbols using the digital model, each holographic symbol indicating the intensity of radioactive radiation of one of the recorded measurements and being placed so as to appear visible to said operator at the corresponding spatial coordinates;

the operators all intervene in the radioactive area during the intervention stage, the intervention stage comprising at least the following sub-steps:

Repeatedly measuring the intensity of the radioactive radiation with the portable detector worn by each operator, and determining the spatial coordinates of the portable detector at the time of the measurement;

recording in the common numerical model of a plurality of said measurements and the corresponding spatial coordinates.

An intervention set for at least one operator in a radioactive zone is also provided, the set comprising:

a digital model representing the three-dimensional topography of the radioactive zone;

a portable detector making measurements of the intensity of the radioactive radiation;

a module for determining the spatial coordinates of the portable detector at the time of each measurement;

a module for recording in the digital model a plurality of said measurements and the corresponding spatial coordinates;

an augmented reality device carried by at least one operator;

a module for materialising the recorded measurements by a plurality of discrete holographic symbols in the augmented reality device, using the digital model, configured so that each holographic symbol indicates the intensity of the radioactive radiation of one of the recorded measurements and is placed so as to appear visible to the at least one operator at the corresponding spatial coordinates.

BRIEF SUMMARY OF THE DRAWINGS

Other features and advantages of the present disclosure will be shown in the detailed description given below, which is indicative and in no way limitative, with reference to the appended figures, among which.

DETAILED DESCRIPTION

The present disclosure therefore concerns a method of intervention by at least one operator in a radioactive zone 1.

This zone is called radioactive in the sense that it is located in an installation containing radioactive materials. It itself contains or is likely to contain radioactive material.

The installation is a Basic Nuclear Installation (BNI), such as a nuclear reactor, a nuclear fuel cycle facility or a laboratory. Alternatively, the installation is an ICPE (Classified Installation for Environmental Protection) or any other installation.

The area is of any type. This zone is for example a reactor pool, a hot cell or any premises classified as a contaminated zone of an INB opening access to a maintenance operation.

The intervention aims to carry out all kinds of work in the radioactive zone: maintenance work, cleaning, dismantling, etc.

The intervention is carried out by a single operator or, on the contrary, by a team of several operators intervening at the same time or successively in radioactive zone 1.

The method comprises at least the following steps:
obtaining a digital model representing the three-dimensional topography of radioactive zone 1;
intervention by at least one operator in radioactive zone 1, the intervention step comprising at least the following sub-steps:
repeatedly measuring the intensity of the radioactive radiation with a portable detector 3 (FIG. 2), and determining the spatial coordinates of the portable detector 3 at the time of measurement;
recording in the digital model of a plurality of said measurements and the corresponding spatial coordinates;
materialisation of the recorded measurements in an augmented reality device 5 (FIG. 2) carried by the at least one operator, by a plurality of discrete holographic symbols 7 (FIG. 3), using the digital model, each holographic symbol 7 indicating the radioactive radiation intensity of one of the recorded measurements and being positioned so as to appear visible to the at least one operator at the corresponding spatial coordinates.

The hand-held detector 3 is preferably worn by at least one operator. It is configured to measure the dose rate where the operator is standing.

Typically, the intensity of the radioactive radiation is measured continuously by the portable detector 3.

When several operators are involved, each operator is equipped with a portable detector 3.

The portable detector is of any suitable type. It is designed for example to measure radiation γ, or β, or any other type of radiation.

The augmented reality device 5 typically consists of a helmet 9 worn by at least one operator, with a translucent display surface 10 placed in front of the eyes of at least one operator.

For example, augmented reality device 5 is of the Microsoft Hololens® type.

Typically, each operator is equipped with an augmented reality device 5 of the above type, with a helmet 9.

A supervisory post 11 (FIG. 1) is placed at a distance from radioactive zone 1, for example in a room 13 where the radiological conditions allow a permanent presence. Communication means 15 are configured to allow the exchange of data between the or each augmented reality device 5 and the supervision station 11.

Figure 1:
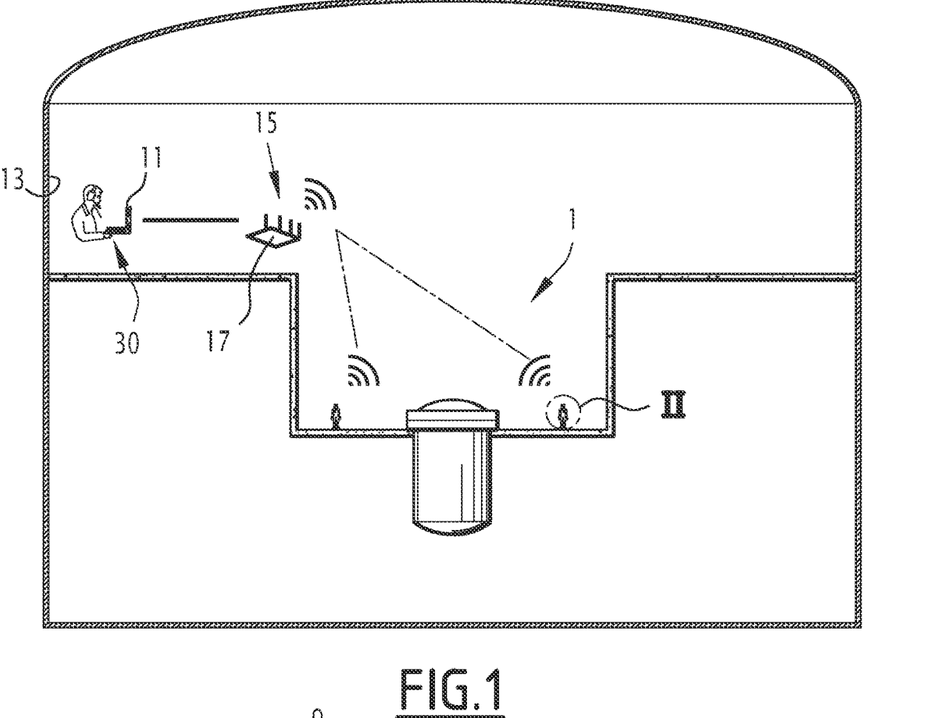
FIG. 1 is a simplified schematic representation of the overall intervention of the present disclosure.

In the example shown in FIG. 1, the means of communication 15 comprise one or more wifi transceivers 17, connected in a wired way to the supervision station 11, for example by an RJ45 type link.

The or each augmented reality device 5 (FIG. 2) is equipped with a wifi communication module, enabling data to be sent or received at the or each wifi transmitter/receiver 17.

The portable detector 3 carried by the operator communicates with the augmented reality device 5 carried by the said operator, preferably using a Bluetooth communication protocol.

An additional operator, called a supervisor, manages the supervision station 11, preferably also equipped with an augmented reality device 5, of the same type as the one worn by the or each other operator, or with a virtual reality helmet, or with a computer allowing to visualize the images seen by the operators.

Figure 2:
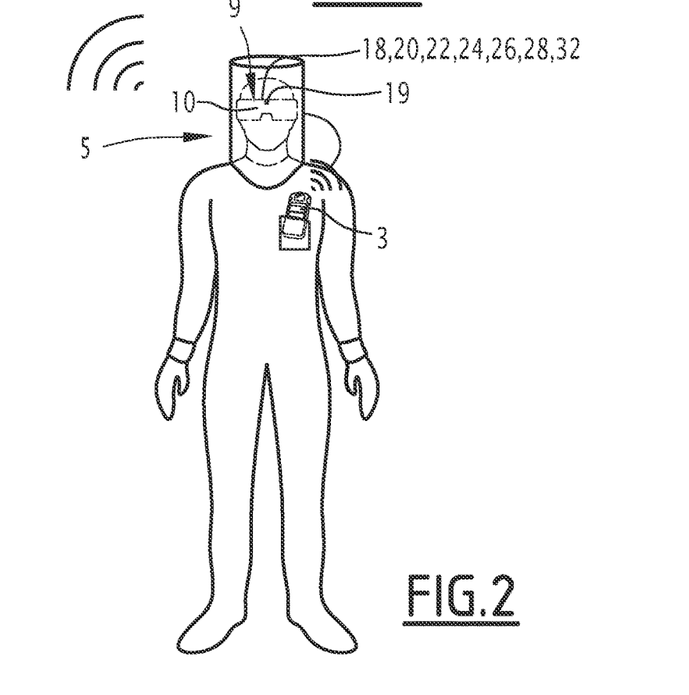
FIG. 2 is a zoom on an element of FIG. 1.

The determination of the spatial coordinates of the portable detector 3 at the time of measurement of the intensity of the radioactive radiation is carried out by a geolocation module 18, typically integrated into the augmented reality device 5 (FIG. 2). Alternatively, this module is independent of the augmented reality device 5.

The digital model represents the topography, i.e. the geometry, of the entire radioactive zone 1, or of only part of it. It describes both the civil engineering structures and the equipment located in radioactive zone 1.

The digital model is stored in the augmented reality 5 device. When several operators are involved, it is stored in the augmented reality 5 device of each operator. it is modified simultaneously in each augmented reality device 5.

Alternatively, it is stored in the supervision station 11, or in any other adapted digital storage space accessible by the augmented reality 5 devices of all the operators.

The step of obtaining the digital model includes:
a sub-stage of recording images of radioactive zone 1 with one or more cameras 19, and
a sub-step of determining the digital model using the recorded images.

The or each 19 camera is carried by the operator. Advantageously, it is part of the helmet 9 of the augmented reality device 5 (FIG. 2).

The determination of the digital model using the recorded images is carried out by the augmented reality device. This functionality exists in the Microsoft Hololens® augmented reality device. The method of determining the digital model will therefore not be described in detail here.

The step of obtaining the digital model is performed simultaneously with the intervention step, with the digital model being gradually determined or enriched with the images recorded during the intervention step.

Specifically, during the first intervention by an operator in radioactive zone 1, the images recorded by the camera or cameras carried 19 by the operator are used to create the digital model.

During subsequent operator interventions, the additional images recorded by the or each camera 19 carried by the operator are used to enrich the digital model, i.e. to complete it or make it more accurate. In particular, the recorded images are used to extend the digital model so that it represents parts or equipment of the radioactive area not yet covered at the end of the first intervention.

As described above, the digital model is advantageously shared by the operators.

This means that the same digital model is stored in each augmented reality device 5. Changes to the common model are made simultaneously in all augmented reality devices, regardless of the origin of the changes.

In particular, during the interventions of each operator, the images recorded by the camera carried by the said operator are used to enrich the common digital model.

The recording of one of the measurements and its materialisation by a holographic symbol is preferably triggered by at least one operator, said discrete holographic symbol materializes the intensity of the radioactive radiation measured by the portable detector 3 at the time of triggering.

It is triggered, for example, by a hand movement of the operator in front of the camera 19. This is particularly convenient when the operator is wearing protective clothing such as a TEV (leaktight ventilated suit).

Alternatively, triggering can be carried out at the press of a button, by voice, or by other means.

The holographic symbols 7 are displayed on the display panel 10 so as to be shown to the least one operator is shown at the correspondingly defined spatial coordinates.

Figure 3:
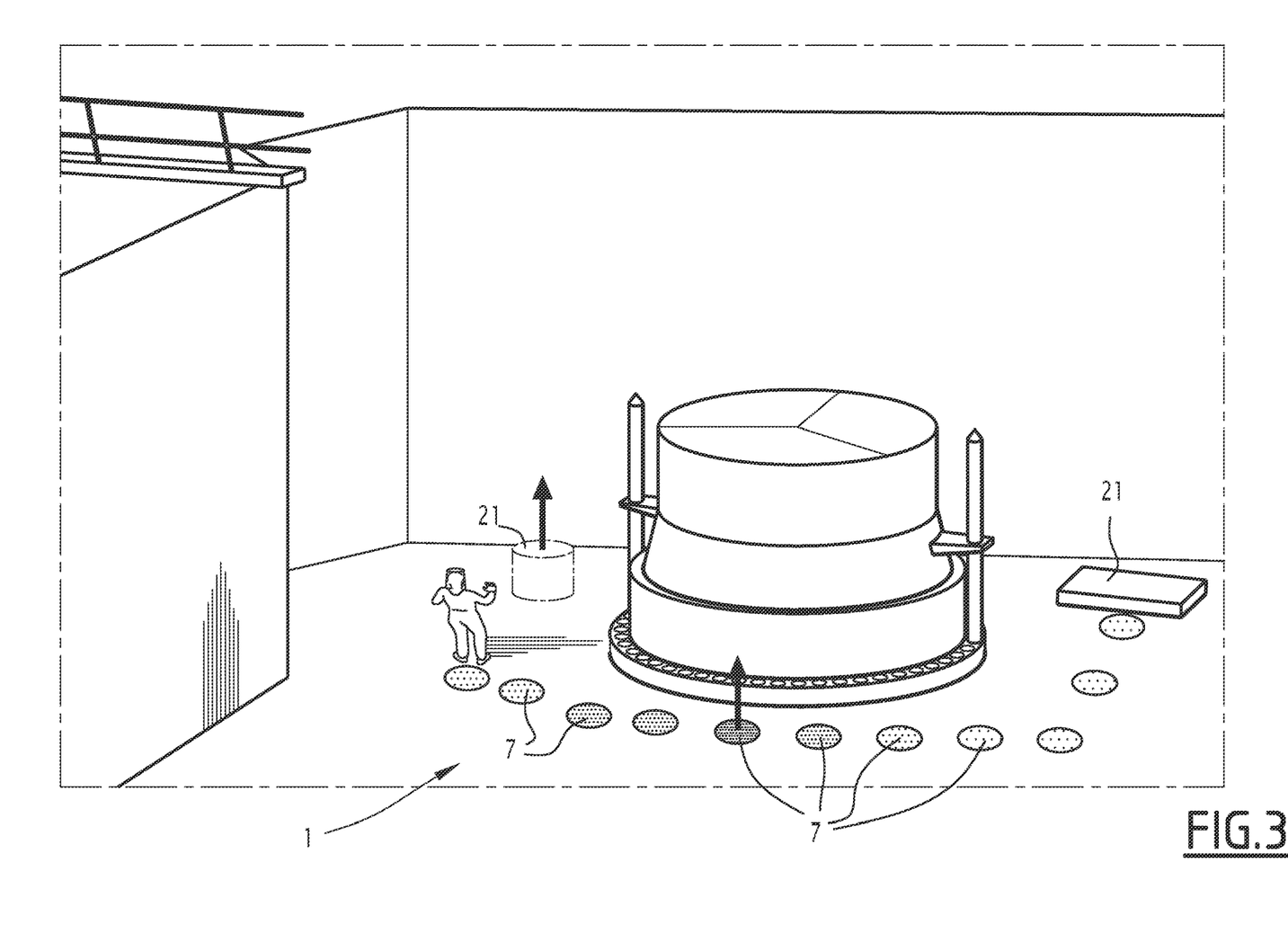
FIG. 3 is a perspective view illustrating the holograms added by the augmented vision device in the field of vision of operators.

For example, each holographic symbol 7 is a coloured dot placed on the ground, as shown in FIG. 3. The point is a disc, or a rectangle, or any other suitable shape. It has no thickness or, on the contrary, has a non-zero height.

Advantageously, the recorded measurement is digitally indicated on the point, in a legible way for the operator.

The colour of the point is chosen according to the value of the recorded measurement. For example, it complies with the colorimetric standard in force in the basic nuclear installation where the intervention is carried out.

For example, the point is:
blue when the measured equivalent dose rate is between 0.5 µSv/h and 7.5 µSv/h;
green when the measured equivalent dose rate is between 7.5 µSv/h and 25 µSv/h;
yellow when the measured equivalent dose rate is between 25 µSv/h and 2 mSv/h;
orange when the measured equivalent dose rate is between 2 mSv/h and 100 mSv/h;
red when the measured equivalent dose rate is greater than 100 mSv/h.

The holographic symbol 7 is advantageously different when the recorded measurement exceeds a predetermined threshold, e.g. 2.5 mSv/h. The holographic symbol 7 in this case is chosen to be highly visible, so as to indicate the presence of a hot spot. In the example shown in FIG. 3, this symbol is a red dot on the ground, with a red triangle above the dot, connected to the dot by a black vertical line.

The holographic symbol 7 is chosen and positioned automatically by the augmented reality device 5.

Holographic symbols 7 are called discrete because they are distinct and separate from each other. They do not together form a continuous volume representing the spatial distribution of dose rate throughout the radioactive zone. The operator sees only a small number of holographic symbols, created by him or by other operators.

Typically, these holographic symbols will be distributed along his or her path through radioactive zone 1, between the point of entry into radioactive zone 1 and the various workstations.

In an advantageous variant, the addition of a discrete holographic symbol 7 in the augmented reality device 5 is triggered when the intensity of the radioactive radiation measured by the portable detector 3 is above a predetermined value.

This is triggered automatically.

In one alternative embodiment, the addition of a symbol is triggered when the intensity of radioactive radiation measured by the hand-held detector 3 is greater than an absolute value, independent of the operator's position in the radioactive zone. This value is, for example, stored in detector 3.

In another variant, a map of the spatial distribution of the dose rate throughout the radioactive zone is recorded prior to the intervention, for example in the same digital storage space as the digital model.

An automatic trigger module 20 (FIG. 2) continuously compares the measurement of the radioactive radiation intensity provided by the portable detector with the measurement recorded on the map at the location of detector 3. The recorded measurement corresponds to the predetermined value mentioned above. If the measurement of the portable detector is higher than the recorded measurement, the automatic trigger module 20 automatically triggers the recording and materialisation sub-step. The added holographic symbol is advantageously different from the others so as to attract the operator's attention.

The automatic trigger module 20 is, for example, integrated in the augmented reality device 5.

When several operators all intervene in the radioactive area during the intervention stage, the intervention stage comprises at least the following sub-steps:
repeatedly measuring the intensity of the radioactive radiation with the portable detector 3 worn by each operator, and determining the spatial coordinates of the portable detector 3 at the time of the measurement;
recording in the common numerical model of a plurality of said measurements and the corresponding spatial coordinates.

In this way, each operator supplies the common digital model with the recorded values.

The operators intervene together in the radioactive area, or one after the other.

Moreover, when the digital model is shared between several operators, the holographic symbols 7 are placed by each operator's augmented reality device 5 in such a way as to appear to the said operator at the corresponding spatial coordinates.

In this way, each operator sees the discrete holographic symbol at a distance and at an angle depending on his current position.

According to another aspect, the method comprises a step of recording in the digital model at least one of the following elements associated with corresponding spatial coordinates: ALARA fallback zone, conventional non-nuclear risk.

In this case, the intervention step includes a sub-step of materialisation of the at least one element in the augmented reality device by a specific holographic symbol 21 appearing for the operator at the corresponding spatial coordinates (see FIG. 3).

Conventional risk is, for example, a hole in the floor creating a fall hazard for the operator, or a lifting cone, i.e. a volume located under a load-handling device such as a crane or hoist.

The specific holographic symbol can be different for each type of risk so that the operator can understand the nature of the risk when seeing it. In the example shown in FIG. 3, the specific holographic symbol 21 is a red triangle, similar to a road sign.

The ALARA fallback zone is an area where the dose rate is particularly low. Operators can stop there for a long time if necessary, to perform tasks that do not require their presence at a specific point in the radioactive zone.

The ALARA fallback zone is, for example, marked by a specific holographic symbol 21 in the form of a parallelepiped. The word ALARA is inscribed on the parallelepiped in a manner visible to the operator. The colour of the specific holographic symbol 21 is chosen according to the dose rate at the ALARA fallback zone. It complies, for example, with the colorimetric standard in force in the nuclear installation where the intervention is carried out, as described above.

When the digital model is shared between several operators, each operator's augmented reality device displays the specific holographic symbol 21 for that operator at the corresponding spatial coordinates (see FIG. 3).

The recording step in the digital model is carried out by the supervisor at supervisory station 11, or is performed by one of the operators. For example, the operator positions himself where the specific holographic symbol 21 is to appear and performs a gesture in front of camera 19 of the augmented reality device 5. The gesture to be made is different depending on the risk to be reported. The augmented reality device 5 detects and interprets the gesture and records the corresponding element in the digital model, with the corresponding spatial coordinates provided by the geolocation module 18.

It should be noted that each alternative operator is equipped with one or more other portable detectors, for example a contamination meter. The measurements made by the or each other portable detector, and the corresponding spatial coordinates of the portable detector at the time of measurement, are recorded in the digital model. These measurements are also represented by holographic symbols in the augmented reality device.

The present disclosure also relates to an intervention set for at least one operator in a radioactive zone 1. The set comprises (FIG. 2)
- a digital model representing the three-dimensional topography of radioactive zone 1;
- at least one portable detector 3 carrying out measurements of the intensity of radioactive radiation;
- a module 18 for determining the spatial coordinates of the portable detector 3 at the time of each measurement;
- a module 22 for recording in the digital model a plurality of said measurements and the corresponding spatial coordinates;
- an augmented reality device 5 carried by at least one operator;
- a module 24 for materialising the recorded measurements by a plurality of discrete holographic symbols in the augmented reality device 5, using the digital model.

The materialisation module 24 is configured so that each discrete holographic symbol indicates the intensity of the radioactive radiation of one of the recorded measurements and is placed so as to appear visible to the at least one operator at the corresponding spatial coordinates.

The portable detector 3 and the spatial co-ordinates determination module 18 of the portable detector 3 are as described above.

The augmented reality device 5 is as described above. It is typically of the Microsoft Hololens® type.

Augmented reality device 5 typically consists of a helmet 9 worn by at least one operator, with a translucent display surface placed in front of the eyes of the at least one operator.

The set preferably includes a module 26 for obtaining the digital model, itself comprising:
- at least one camera 19 configured to record images of radioactive zone 1, and
- a sub-module 28 for determining the digital model using the recorded images.

The or each camera 19 is carried by the operator. Advantageously, it is part of the helmet 9 of the augmented reality device 5.

Sub-module 28 for determining the digital model using the recorded images is integrated into the augmented reality device. This functionality exists in the Microsoft Hololens® augmented reality system. The method of determining the digital model will therefore not be described in detail here.

Module 22 for recording measurements and spatial coordinates is typically integrated into the augmented reality device 5.

The materialisation module 24 is typically integrated in the augmented reality device 5 and is configured so that the holographic symbols are displayed on the display surface 10 in such a way that they appear to at least one operator at the correspondingly determined spatial coordinates.

The recording and materialisation modules 22, 24 are configured so that the recording of one of the measurements and its materialisation by a holographic symbol is triggered by the at least one operator, the said discrete holographic symbol materialising the intensity of the radioactive radiation measured by the portable detector 3 at the time of triggering.

The recording and materialisation modules 22, 24 are configured so that triggering is carried out, for example, by a hand gesture of the operator in front of camera 19.

Alternatively, the recording and materialisation modules 22, 24 are configured so that triggering is performed at the press of a button, by voice or by other means.

In an advantageous variant, the intervention set is configured so that the addition of a discrete holographic symbol 7 to the augmented reality device 5 is triggered when the intensity of radioactive radiation measured by the hand-held detector 3 is above a predetermined value.

This triggering is automatic.

According to an alternative embodiment, the intervention set is configured so that the addition of a symbol is triggered when the intensity of the radioactive radiation measured by the portable detector 3 is greater than an absolute value, independent of the operator's position in the radioactive zone. This value is, for example, recorded in detector 3.

In another variant, a map of the spatial distribution of the dose rate throughout the radioactive zone is recorded prior to the intervention, for example in the same digital storage space as the digital model.

An automatic trigger module 20 continuously compares the measurement of the radioactive radiation intensity provided by the portable detector with the measurement recorded on the map at the location of detector 3. The recorded measurement corresponds to the predetermined value mentioned above. If the measurement of the portable detector is higher than the recorded measurement, the automatic trigger module 20 automatically triggers the recording and materialisation sub-step. The added holographic symbol is advantageously different from the others so as to attract the operator's attention.

The automatic trigger module 20 is, for example, integrated in the augmented reality device 5.

Typically, the set includes a measuring device 3 associated with a module 18 for determining the spatial coordinates of the portable detector 3 for each operator. It also includes an augmented reality device 5, associated with recording and materialisation modules 22, 24, for each operator.

The set also includes a supervision station 11 placed at a distance from radioactive zone 1, for example in a room 13 where the radiological conditions allow a permanent presence (FIG. 1). The set also includes communication means 15 configured to allow the exchange of data between the or each augmented reality device 5 and the supervision station 11.

Supervision station 11 is equipped to transmit all kinds of information to the operators. In particular, the supervisor can assist the operators by sharing their audio, video flow (images from the front cameras 19), communicate with them, send in the operators' field of vision a flow of information to assist them in their activity (operating mode or plan in PNG, WORD or PDF format, video flow from an external camera, images, as well as the sharing of the complete supervisor screen, etc.). It can also carry out regulatory checks remotely.

The means of communication between the augmented reality 5 devices and the supervision station 11 also enable the supervisor to view a set of data transmitted by the augmented reality 5 devices:

dosimetry received by each operator, ambient dose rate of each operator and alarms of predefined thresholds;

Alert messages related to the use of portable detectors 3 or augmented reality devices 5 (in particular, charging of the batteries of each operator's equipment);

quality of the network used.

Preferably, the set includes a module 30 for recording in the digital model at least one of the following elements associated with corresponding spatial coordinates: ALARA fallback zone, conventional non-nuclear risk.

In this case, the materialisation module 24 includes a sub-module 32 for materialisation of at least one element in the augmented reality device by a specific holographic symbol 21 appearing for the operator at the corresponding spatial coordinates (see FIG. 3).

The said module 30 for recording in the digital model is integrated in the supervision station 11, or is integrated in each augmented reality device 5, in which case it is configured so that the operator places himself where the specific holographic symbol 21 is to appear and performs a gesture in front of camera 19 of the augmented reality device 5. The gesture to be made is different depending on the risk to be reported. The augmented reality device 5 detects and interprets the gesture, and records the corresponding element in the digital model, with the corresponding spatial coordinates provided by the geolocation device 18.

It should be noted that the set, as a variant, includes for each operator one or more other portable detectors, for example a contamination meter. The recording and materialisation modules are configured so that the measurements made by the or each other portable detector, and the corresponding spatial coordinates of the portable detector at the time of measurement, are recorded in the digital model. The recording and materialisation modules are configured so that the measurements are also materialised by holographic symbols in the augmented reality device.

The set described above is specially designed for the implementation of the method of the present disclosure. Conversely, the process of the present disclosure is particularly well adapted for implementation by the set just described.

The present disclosure has been described above for an embodiment where the digital model is obtained during the intervention stage, using images from one or more cameras carried by the operator(s). According to another embodiment, the digital model is obtained before the intervention stage, for example during a preliminary photographic campaign. It is loaded into the augmented reality device(s) 5 before the intervention.

The present disclosure could also be used to simulate an intervention. In this case, a mobile computer application could generate measurements of radioactive radiation intensity, replacing those of the dosimeter. These measurements would be processed as described above. In particular, the recording and materialisation of the measurements by holographic symbols would be triggered by the operator, as in a real intervention. It would thus be possible to reproduce hotspots or classic safety risks during training sessions.

The invention claimed is:

1. A method of intervention by at least one operator in a radioactive zone, the method comprising the following steps:

obtaining a digital model representing the three-dimensional topography of the radioactive zone;

intervention of at least one operator in the radioactive zone, the intervention step comprising at least the following sub-steps:

repeatedly, measuring an intensity of the radioactive radiation by a portable detector carried by the at least one operator, and determining the spatial coordinates of the portable detector at the time of measurement;

recording in the digital model of a plurality of said measurements and the corresponding spatial coordinates;

materialisation of the recorded measurements in an augmented reality device carried by the at least one operator, by a plurality of discrete holographic symbols, using the digital model, each holographic symbol indicating the intensity of the radioactive radiation of one of the recorded measurements, said symbol being materialized so as to appear to the at least one operator standing at a current position at the corresponding spatial coordinates where the at least one operator was standing when measuring the intensity of said recorded measurement at the sub-step of measuring the intensity of the radioactive radiation.

2. The method according to claim 1, wherein the augmented reality device comprises at least one helmet worn by the at least one operator, with a translucent display surface placed in front of the eyes of the at least one operator, wherein the holographic symbols are displayed on the display surface in such a way that the holographic symbols appear visible to the at least one operator at the corresponding determined spatial coordinates.

3. The method according to claim 1, wherein the obtaining step comprises a sub-step of recording images of the radioactive zone with at least one camera, and a sub-step of determining the digital model using the recorded images.

4. The method according to claim 3, wherein the obtaining step is carried out simultaneously with the intervention step, the digital model being progressively determined or enriched with the images recorded during the intervention step.

5. The method according to claim 1, wherein the recording of one of the measurements and the materialisation of said recorded measurement are triggered by the at least one operator, the said discrete holographic symbol materialising the intensity of the radioactive radiation measured by the portable detector at the moment of triggering.

6. The method according to claim 1, wherein the addition of a discrete holographic symbol to the augmented reality device is triggered when the intensity of the radioactive radiation measured by the portable detector is greater than a predetermined value.

7. The method according to claim 1, further comprising a step of recording in the digital model at least one of the elements associated with corresponding spatial coordinates selected from the group consisting of ALARA fallback zone and conventional non-nuclear risk;

the intervention step comprising a sub-step of materialisation of the at least one element in the augmented reality device by a specific holographic symbol appearing visibly to the operator at the corresponding spatial coordinates.

8. The method according to claim 1, wherein the digital model is shared by several operators, each operator being equipped with an augmented reality device materialising the recorded measurements by a plurality of discrete holographic symbols using the digital model, each holographic symbol indicating the intensity of the radioactive radiation of one of the recorded measurements and being placed so as to appear visible to said operator at the corresponding spatial coordinates.

9. The method according to claim 8, wherein the operators all intervene in the radioactive zone during the intervention step, the intervention step comprising at least the following sub-steps:
repeatedly, measuring an intensity of the radioactive radiation by the portable detector carried by each operator, and determining the spatial coordinates of the portable detector at the time of the measurement; and
recording in the shared digital model of a plurality of said measurements and the corresponding spatial coordinates.

10. The method according to claim 1, wherein at the sub-step of recording images of the radioactive area, the at least one camera is carried by the at least one operator.

11. A method of intervention by at least one operator in a radioactive zone, the method comprising the following steps:
obtaining a digital model representing the three-dimensional topography of the radioactive zone;
intervention of at least one operator in the radioactive zone, the intervention step comprising at least the following sub-steps:
repeatedly, measuring an intensity of the radioactive radiation by a portable detector, and determining the spatial coordinates of the portable detector at the time of measurement;
recording in the digital model of a plurality of said measurements and the corresponding spatial coordinates;
materialisation of the recorded measurements in an augmented reality device carried by the at least one operator, by a plurality of discrete holographic symbols, using the digital model, each holographic symbol indicating the intensity of the radioactive radiation of one of the recorded measurements and being placed so as to appear visible to the at least one operator at the corresponding spatial coordinates; and
recording in the digital model at least one of the elements associated with corresponding spatial coordinates selected from the group consisting of ALARA fallback zone and conventional non-nuclear risk;
the intervention step comprising a sub-step of materialisation of the at least one element in the augmented reality device by a specific holographic symbol appearing visibly to the operator at the corresponding spatial coordinates.

* * * * *